United States Patent [19]

Umpleby et al.

[11] 4,045,715

[45] Aug. 30, 1977

[54] OPERATOR MOTOR CONTROL

[75] Inventors: Kenneth F. Umpleby, Ann Arbor; Maurice R. Brackney, Warren, both of Mich.

[73] Assignee: Multi-Elmac Company, Novi, Mich.

[21] Appl. No.: 587,399

[22] Filed: June 16, 1975

[51] Int. Cl.² .............................................. H02H 7/85
[52] U.S. Cl. ...................................... 318/16; 318/282; 318/466; 318/207 R
[58] Field of Search ............... 318/288, 289, 282, 466, 318/467, 468, 16, 265, 266, 207 R, 207 A, 207 B, 207 C, 207 K, 207 J

[56] References Cited

U.S. PATENT DOCUMENTS

| 2,914,717 | 11/1959 | Redding | 318/207 K |
|---|---|---|---|
| 3,366,855 | 1/1968 | Huber et al. | 318/16 |
| 3,495,151 | 2/1970 | Hutner | 318/284 |
| 3,539,894 | 11/1970 | Feldman | 318/469 X |
| 3,551,770 | 11/1970 | Isaacs | 318/681 X |
| 3,582,739 | 6/1971 | Daab | 318/467 X |
| 3,891,909 | 6/1975 | Newson | 318/282 X |

OTHER PUBLICATIONS

Technical Specification, Sears Garage Door Opener, Model 139,652300.

Primary Examiner—B. Dobeck
Attorney, Agent, or Firm—Krass & Young

[57] ABSTRACT

Control system including radio receiver circuit for a power-driven operator for garage doors and the like comprising an operator control circuit having a regulated DC voltage source operating as a power supply for an electronic flip-flop device responsive to successively applied input signals to establish circuits of opposite direction through a reversible electric motor; i.e., one actuation causes the motor to run in one direction and the next actuation causes it to run in the opposite direction. The operator is subject to actuation by both a hard-wired push-button and a radio receiver which is responsive to signals from a remote transmitter. The power supply for the flip-flop is also the power supply for the receiver; however, the receiver is packaged separately from the operator and power supply and is readily disconnected for independent maintenance and repair.

14 Claims, 4 Drawing Figures

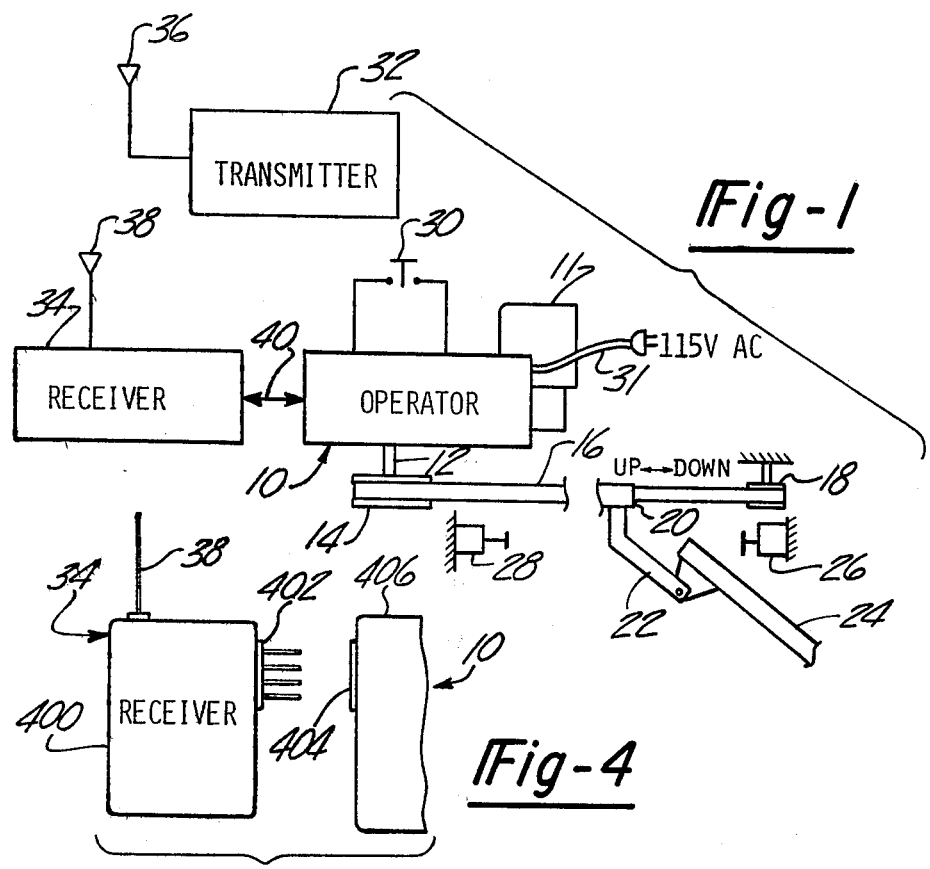
Fig-1
Fig-4
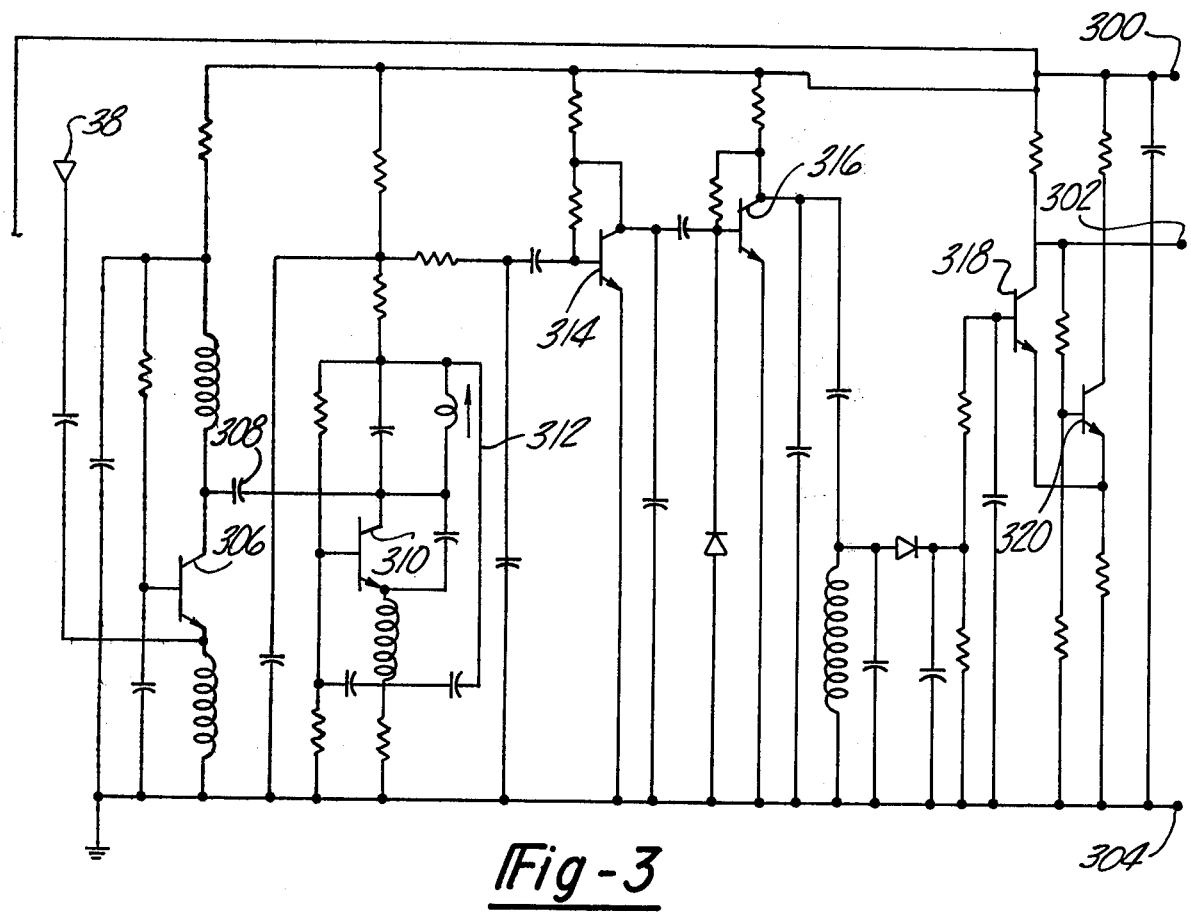
Fig-3

OPERATOR MOTOR CONTROL

INTRODUCTION

This invention relates to control circuits for motors incorporated into reversible power drives for closures such as garage doors and the like, and more particularly to a control circuit which is adapted to be operated by both push-button and remote radio transmitter means.

BACKGROUND OF THE INVENTION

Radio operated power drive systems for garage doors, security gates, and other movable members are in common use and typically comprise a reversible electric motor together with an input signal source such as a push-button radio transmitter/receiver or a combination of such means for alternately starting the motor in opposite directions of travel. A stop command is typically provided by devices such as limit switches which respond to displacement of the movable member at the opposite limits of travel to open circuit the motor. To insure that the motor is alternately driven in opposite directions for each of successively applied input signals it has been common to use a mechanical relay device having a coil and a magnetically displaceable armature element which alternately toggles in a pivot arrangement to make opposite electrical circuits to the drive motor. The relay, often a "ratchet relay," is a mechanically bistable device and has been in use in domestic and commercial garage door operators for many years. It is, however, relatively expensive and requires a momentarily large current surge for proper operation.

Power operators are often provided with push-button actuators. However, it is typically desirable to further provide for the remote operation of garage door and gate operators by means of a small radio transmitter/receiver combination. The receiver operates in response to appropriate radio frequencies to provide the momentary current surge to the bistable relay thereby to appear in the electrical sense to be the equivalent of the momentary closure of a push-button or other similar switch.

The radio receiver requires a regulated power supply for proper recognition of the transmitter pulses as will be apparent to those skilled in the radio transmission art. Generally the receiver and power supply is carried in a housing for the radio receiver which is separate from the operator housing so that the receiver may be quickly and easily removed for service without the necessity for complete demounting of the operator. Thus, when the receiver is detached from the operator housing for service, the regulated voltage source is removed with it.

BRIEF SUMMARY OF THE INVENTION

It is an object of the invention to provide an improved operator for controlling the displacement of garage doors, gates and other similarly displaceable objects wherein the electromechanically bistable relay device of the prior art is replaced with an all electronic bistable device commonly known as a solid-state flip-flop. It is the further object of the invention to provide a regulated DC power supply for the electronic flip-flop device which is packaged with the main operator circuitry; i.e., is substantially permanently packaged with and electrically interconnected with the motive power source of the operator but which is selectively electrically interconnectable with a detachable radio receiver. Accordingly, the subject operator including the bistable flip-flop device may be used in combination with a simple input signal generator such as a push-button, a remotely actuable input signal generator such as a radio transmitter/receiver combination or with both of such input means, yet a single DC power supply is provided for both the electronic flip-flop device and the radio receiver. This has the advantage of saving unnecessary duplication of parts, providing for the expeditious removal of the receiver circuitry for repair, and at the same time, placing the DC regulated voltage source in continuous operative association with the electronic flip-flop device.

A further feature of the invention is the provision of a fail-safe motor control circuit comprising first and second switch means which are complementally operable by the bistable flip-flop device to assume open and closed conditions between a line voltage source and the reversible electric motor which forms the motive power source of the operator. In addition, the switch means are electrically interconnected such that the inadvertent operation of both switch means to the closed condition effectively disconnects the motor from the power source and prevents improper operation thereof.

Still further features and advantages of the invention including, for example, a fail-safe power drop-out circuit will be described in the following specification which is to be taken with the accompanying drawings.

BRIEF DESCRIPTION OF THE DRAWINGS

FIG. 1 is a simplified schematic diagram of an operator for garage doors and the like wherein operation of the system to open and close the door may be initiated by either or both of a remote radio transmitter and a hard wired push-button;

FIG. 3 is an electrical circuit diagram of the radio receiver circuit of the operator system of FIG. 1; and FIG. 4 is a drawing of a packaging concept for an operator radio/receiver combination.

DETAILED DESCRIPTION OF THE SPECIFIC EMBODIMENT

FIG. 1

Figure 2:
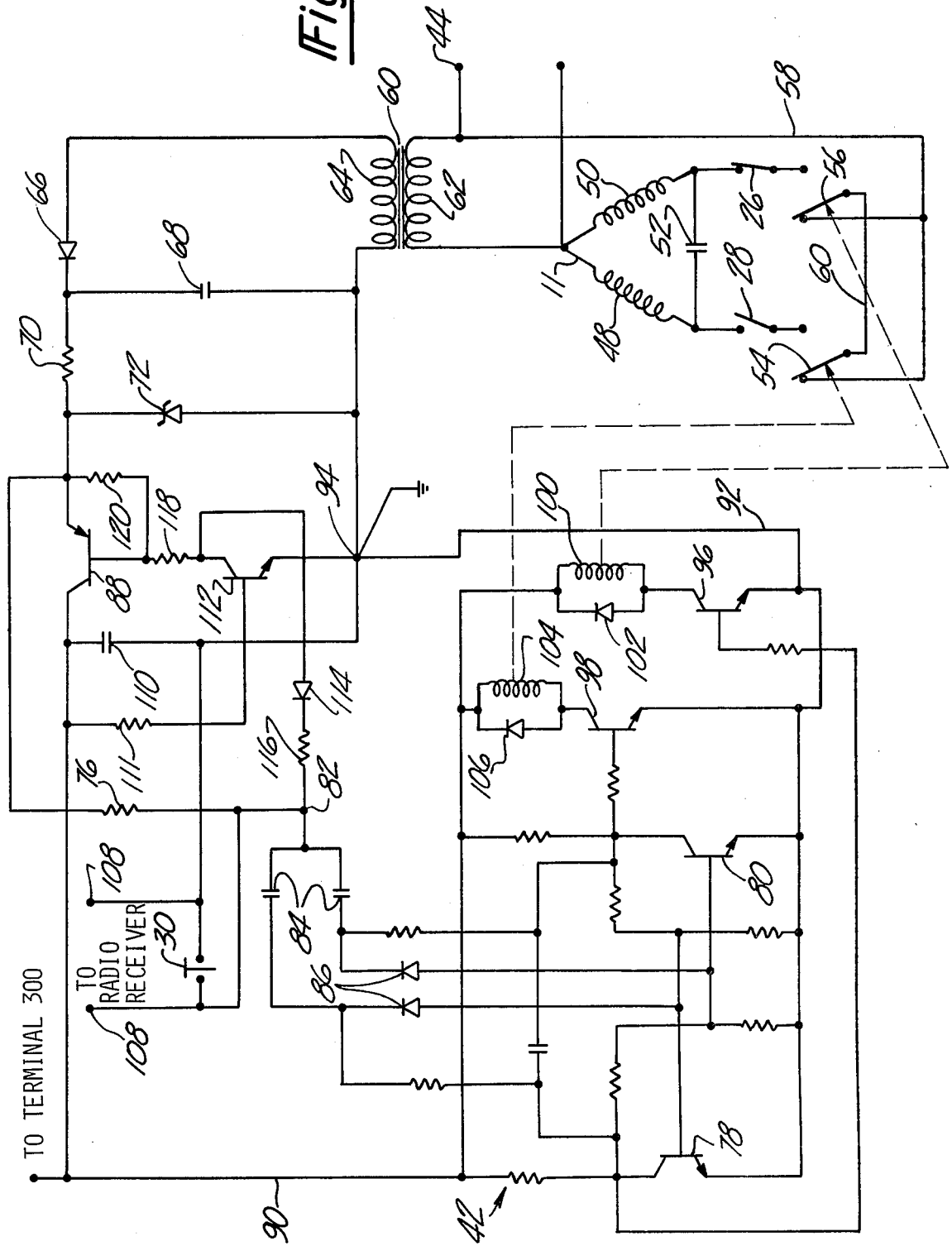
FIG. 2 is an electrical circuit diagram of the control circuit for the operator of FIG. 1.

FIG. 1 shows an operator 10 comprising control circuitry to be described for controlling the operation of a reversible electric motor 11 in such a fashion as to alternately open and close a movable object such as an overhead garage door 24. Operator 10 comprises a gear type speed reducer for the reversible electric motor 11 and having an output shaft 12 connected to a drive sprocket to rotate the sprocket in opposite directions to raise and lower door 24. Chain 16 or the like extends from sprocket 14 to an idler sprocket 18 which is suspended above the garage door 24. A traveler assembly 20 is fixed to the chain 16 and is interconnected with the door 24 by means of arm 22.

Motor 11 is started either by operation of a push-button 30 or a radio transmitter 32. The motor 11 is thereafter shut-off at the opposite limits of door travel by limit switches 26 and 28 representing the closed and opened positions, respectively. Power for the motor 11 and the associated control circuitry is provided by a standard plug and cable combination 31 which connects to the household 115 volt AC supply as shown. In FIG. 1 the limit switches 26 and 28 are shown externally of the operator 10 for clarity of discussion; it will be understood by those familiar with the construction of garage door and gate operators that such limit switches are typically incorporated into the operator housing 10 and are subject to physical operation by an adjustable traveler assembly the movement of which is the analog of the movement of door 24. Details of such a limit switch apparatus are shown in the U.S. pat. to Miller No. 2,951,920.

For remote operation of operator 10 a transmitter 32 is operative to send radio signals of a specified frequency to a receiver 34 which is electrically interconnected with the operator 10. The interconnection is such that a signal from receiver 34 is treated by the operator 10 exactly as a signal from push-button 30; i.e., it starts motor 11. Transmitter 32 carries antenna 36 and receiver 34 carries antenna 38 as will be understood by those skilled in the radio communication art. The large double-ended arrow 40 represents in the system of FIG. 1 a selectively removable electrical and mechanical interconnection between the receiver 34 and the operator 10 to provide: (a) regulated DC power to the receiver circuitry, and (b) a signal path for communication of the receiver signal to the operator 10.

Because of the selectively disconnectable nature of the interconnection 40, the receiver circuit may be removed for independent service while leaving the operator 10 fully operable using the push-button 30.

FIG. 2

Referring now to FIG. 2 the details of a preferred control circuit comprising an all electronic solid-state flip-flop device 42 will be described. It will be appreciated that while the circuitry of the subject invention is described with reference to discrete components for the sake of clarity, a variety of specific implementations including integrated circuits are contemplated.

In FIG. 2 line voltage is applied across input terminals 44 via the plug/cable combination 31 as previously described. Motor 11 includes first and second windings 48 and 50 and a phase shifting capacitor 52. To alternately drive the motor in opposite directions of travel, first and second switch means 54 and 56 are complementally operated between opened and closed positions by the solid-state flip-flop device 42 as hereinafter described. Each of switch means 54 and 56 comprises a movable armature disposed adjacent and mechanically movable between "open" and "closed" contacts as shown. The "closed" contact of switch 54 is connected through the up limit switch 28 to one side of capacitor 52 whereas the "closed" contact of switch 56 is connected through the down limit switch 26 to the opposite side of the capacitor. The "open" contacts of the two switches 54 and 56 are commonly connected to one side of the line voltage through conductor 58. Two armatures of switch means 54 and 56 are electrically interconnected by means of conductor 60.

In operation one of the switches 54 and 56 is typically in the open contact position while the other switch is in the closed contact position thereby to establish a complete electrical circuit from line voltage terminals 44 to motor 11 in one direction. Reversing the condition of the two switch means 54 and 56 reverses the direction of current flow through the motor and reverses the direction of motor output shaft rotation. In the event both switches 54 and 56 are in the closed circuit condition, the line voltage is disconnected from the motor since the switches are effectively wired in series; i.e., one switch must be opened and the other switch closed in order for a series circuit to be completed from the line voltage terminal to the direction-determinant side of the motor capacitor 52.

The control circuit of FIG. 2 further comprises a transformer 60 having a primary side 62 connected across the line voltage terminals 44 and a secondary side 64 connected to a half-wave rectifier comprising series diode 66 and shunt capacitor 68. The half-wave rectifier output is connected through a resistor 70 to a Zener diode voltage regulator 72 to provide a regulated 12-volt DC supply. The regulated DC supply voltage is connected through npn transistor 88 and conductor 90 to the solid state flip-flop device 42 to provide power to the complemental states 78 and 80 whenever transistor 88 is conducting. Conductor 90 also connects the regulated DC supply voltage to flip-flop output driver stages 96 and 98 for controlling the conditions of switches 54 and 56 as hereinafter described.

The emitter of transistor 88 is connected through resistor 76 to circuit point 82 which serves as the input trigger point of the flip-flop 42; i.e., successive voltage changes at this point toggle the flip-flop, causing conductivity of one stage to cease and the other to begin in the conventional fashion. Cross coupling circuitry is provided between the output of each stage and the input of the other stage to produce this effect. For an explanation of the transistor flip-flop, also known as a trigger circuit or multi-vibrator, see *Pulse and Digital Circuits,* McGraw Hill, P 595+. Circuit point 82 is connected through the capacitors 84 and parallel combinations of resistors and diodes 86 to the collector electrodes of opposite stages of the flip-flop 42 such that each of successively applied trigger or input signals causes the flip-flop 42 to change state whereby the currently conductive stage is cut-off and the opposite stage goes into conductivity saturation. Each trigger signal reverses flip-flop condition.

Transistor stage 78 directly controls the conductivity of output driver transistor 96 whereas stage 80 directly controls the conductivity of output current driver transistor 98. Transistor 96 is connected in series with a relay coil 100 and the parallel combination of a diode 102. Transistor 98 is connected in series with the parallel combination of relay coil 104 and diode 106. each of the parallel combinations of relay coil and diode is connected to the positive side of the regulated DC power supply via conductor 90 as shown. Relay coil 100 directly determines the position of the armature of switch 56. Coil 104 directly determines the position of armature 54. Hence, the stages of the flip-flop 42 are complementally conductive, the relay coils 100 and 104 are complementally conductive, and the first and second switch means 54 and 56 are complementally operated between the open and closed conditions as previously described. Flip-flop 42 thus controls the direction motor 11 turns with each successive operation thereof.

Push-button 30 is connected between circuit points 94 and 82 to affect the potential on trigger point 82 thereby to provide input signals to the flip-flop 42. In addition, terminals 108 are connected in parallel with the push-button 30 so as to be electrically interconnectable with a radio receiver as hereinafter described. As a result, either a radio receiver signal or a signal from push-button 30 may operate the control circuit of FIG. 2 to initiate motorized movement of door 24.

Describing the circuit of FIG. 2 in greater detail, ground point 94 is connected to the collector side of transistor 88 through a capacitor 110 which is charged to the regulated DC supply voltage whenever transistor 88 is conductive. The collector side of transistor 88 is also connected through a resistor 112 to the base electrode of a second transistor 112, the emitter/collector circuit of which is connected in series between the base electrode of transistor 88 and the ground point 94 as shown. The collector of transistor 112 is connected through diode 114 and resistor 116 to circuit point 82 and also to the base of transistor 88 through a resistor 118. A bias resistor 120 is connected between the base and emitter of transistor 88. Accordingly, closing the push-button switch 30 (or operating the radio receiver) causes transistor 112 to turn on which in turn causes transistor 88 to become conductive if the 15-volt regulated DC power is provided; i.e., if the line voltage is present on terminals 44, the transformer 60 is operative and half-wave rectifier 66, 68 is operative. If the line voltage is temporarily absent transistor 88 becomes non-conductive and the latch provided by transistor 112 drops out. Even though the line voltage may thereafter come back on, transistor 88 will not become conductive until transistor 112 conducts due to operation of either push-button 30 or transmitter 32. Thus, a temporary failure and return of line voltage cannot operate the door.

In operation, the line voltage terminals 44 are connected to a 115-volt AC supply thereby to provide regulated 15-volt DC power through transistor 88 to the flip-flop 42 as well as to provide power to the reversible electric motor 11. Should push-button 30 be momentarily closed, circuit point 82 is temporarily grounded applying a trigger signal to the flip-flop 42. The grounding of circuit point 82 also grounds the collector of transistor 112 and the base of transistor 88 via resistor 116 and diode 114, truning on transistor 88 and applying the regulated DC voltage to the flip-flop 42. The increased potential on the collector of transistor 88 is applied to the base of transistor 112 via resistor 111, forward biasing that transistor and effectively latching transistor 88 in the conducting state. The flip-flop changes state causing the switches 54 and 56 to reverse positions to close that switch which corresponds with a closed limit switch; for example, switch 56 moves to the closed contact when the down limit switch 26 is also closed thereby to complete a series connection from the line voltage terminal 44 to the motor 11 through the open contact of switch 54, the closed contact of switch 56 and the closed down limit switch 26. When push-button 30 is again closed, the opposite condition obtains.

FIG. 3

As previously described, it is the intention of the subject device to respond identically to radio transmitter produced input signals and push-button produced input signals. To accomplish this in an expeditious and economical fashion, the receiver circuit of FIG. 3 is provided.

The receiver of FIG. 3 is generally conventional except for the absence of any circuitry for converting a 24-volt AC signal to a regulated DC signal which is required for rf reception and decoding. Instead, the receiver circuit of FIG. 3 utilizes the regulated DC voltage which is produced on line 90 by the circuit of FIG. 2 which is permanently wired into the operator 10 of FIG. 1. To this end terminal 300 is adapted for connection to the line 90 by means of a standard removable plug hereinafter described with reference to FIG. 4 to receive the 12-volt DC signal on line 90 after it has passed through the latch transistor 88. The circuit of FIG. 3 further comprises terminals 302 and 304 which are connected across terminals 108 of the circuit of FIG. 2, again by means of a conventional plug device of the type described with reference to FIG. 4. Terminals 302 and 304 thus represent the output terminals of the receiver circuit and operate to provide a trigger signal having the effect of grounding point 82 in the circuit of FIG. 4 exactly as if Push-button 30 had been momentarily closed.

The regulated supply to the circuit of FIG. 3 is applied to terminal 300 as previously decribed. In addition, the actuating signal is a coded radio signal received from transmitter 32 by way of antenna 38 as shown. Antenna 38 is connected to the emitter electrode of detector transistor 306, the output electrodes are connected in an inductively damped series circuit as shown. The collector of transistor 306 is connected through capacitor 308 to the collector of transistor 310 connected into frequency responsive resonant circuit 312 to respond only to input signals in a narrow frequency range. Amplifier stops 314, 316 are connected to Schmitt trigger transistors 318 and 320 to effectively short terminal 302 to the potential on terminal 304 via transistor 318 when conductive. Circuit of FIG. 3 is conventional and will not be described in specific detail. It will be appreciated and understood, however, by those skilled in the radio transmission art that the receipt of the proper rf frequency and pulse count to which the circuit of FIG. 3 is tuned, operates to render transistors 318 and 320 conductive thereby to apply a trigger signal to the flip-flop 42 of FIG. 2.

FIG. 4

Referring now to FIG. 4, a preferred packaging arrangement for the receiver 34 and operator 10 is illustrated. The receiver 34 is preferably separately packaged from the operator 10 in a small plastic case 400 so as to independently support all of the circuitry of FIG. 3 in such a fashion as to be removable from the operator 10 for independent service and maintenance. To this end, housing 400 of receiver 34 is provided with a conventional 4-prong plug 402 which is adapted to be inserted into the female plug portion 404 carried on housing 406 of operator 10. Thus, as previously described, the receiver 34 utilizes the regulated DC power supply of the circuit of FIG. 2 which wholly within the housing 406 of operator 10 but is independently removable therefrom whereupon the regulated DC voltage source operates only in connection with the flip-flop circuit 42 of FIG. 2.

The invention has been described with reference to a specific embodiment and it is to be understood that although this embodiment represents the best mode of practicing the invention known to the inventors at the time of filing the patent application, various modifications and additions to the illustrated embodiment are possible and accordingly the foregoing description is not to be construed in a limiting sense.

The embodiments of the invention in which an exclusive property or privilege is claimed are defined as follows:

1. A selectively operable reversible power drive for closures which are movable between first and second limits of travel comprising; a reversible motive power source, first and second switch means for establishing first and second excitation circuits to said motive power source for causing operation thereof in respectively opposite directions, an electronic bistable circuit device having first and second output stages and responsive to successive applications of an input signal to alternately energize said stages, means operatively interconnecting said first and second stages with said first and second switch means, respectively, thereby to complementally control the conditions of said first and second switch means according to the energization of said stages, a regulated DC voltage source interconnected with said bistable electronic device, and selectively actuable signal generating means connected to the bistable circuit device for applying an input signal thereto with each actuation thereof.

2. Apparatus as defined in claim 1 wherein the means connecting the bistable device stages and the first and second switch means comprises first and second relay coils connected to be energized alternately as the output stages are energized, the coils being in operative association with the switch means to to complementally control the conditions thereof.

3. Apparatus is defined in claim 2 further comprising first and second current drivers connected in series circuit with the first and second relay coils respectively having control electrodes thereof directed connected for control by the output stages of the bistable device.

4. Apparatus as defined in claim 1 wherein the motive power means is a reversible electric motor, the first and second switch means each comprising an armature and opened and closed contacts adapted to be alternately engaged by said armature, means connecting the closed contact of each switch means to respective sides of the motor, means connecting the open contact of each switch means commonly to one side of a line voltage source and means electrically interconnecting the armatures whereby should both of said first and second switch means assume the closed condition the line voltage is disconnected from the motor.

5. Apparatus as defined in claim 1 wherein said regulated DC power supply further includes a first control element such as a transistor interconnecting the power supply with both sides of the bistable device and latch means operative interconnecting the signal generating means with the first control element for the latching the first control element on after the signal generating means is actuated.

6. Apparatus as defined in claim 1 wherein the signal generating means comprises a push button.

7. Apparatus as defined in claim 1 wherein the signal generating means comprises a radio signal receiver.

8. Apparatus as defined in claim 7 further including a radio transmitter for activating said radio receiver to apply said input signal to bistable device.

9. Apparatus as defined in claim 7 further including a first housing means supporting the electronic bistable device and having first plug means and a second housing supporting said radio receiver and having a second plug means operatively associable with said first plug means for removably electrically interconnecting the radio receiver with the bistable device during normal operation therein.

10. Apparatus as defined in claim 9 wherein said DC power supply is connected to the radio receiver through said first and second plug means.

11. Apparatus as defined in claim 1 wherein the reversible motor power source is a reversible motor power source is a reversible electric motor having an output shaft, means interconnecting the output shaft with a door having open and closed positions corresponding with said first and second limits of travel.

12. Apparatus as defined in claim 11 further comprising an open limit switch electrically interconnecting the first switch means with one side of the motor and a close limit switch electrically interconnecting the other switch means with the other side of the motor.

13. Apparatus as defined in claim 12 wherein each of said first and second switch means comprises an armature and adjacent open and closed contact means, means connecting the closed contact means of each of the switches to respective sides of the motor, means connecting the open contact means of each switch commonly to one side of a line voltage source and means electrically interconnecting the armatures whereby should both the first and second switch means be closed the line voltage is disconnected from the motor irrespective of the state of the open and closed limit switches.

14. Apparatus for opening and closing garage doors and the like comprising: a reversible electric motor operable on line voltage from a source; actuator means for starting the motor; a motor control circuit including bistable relay means for alternately reversing the application of line voltage to said motor with each operation of said actuator means; normally non-conducting switch means connected in circuit between the line voltage source and the bistable relay means; and holding circuit means responsive to operation of said actuator means to hold said switch means conductive only during continuous presence of said line voltage whereby said line voltage is disconnected from said bistable relay means whenever said switch means in non-conducting.

* * * * *